United States Patent [19]
Schreiner et al.

[11] 3,759,021
[45] Sept. 18, 1973

[54] GEAR DRIVE AND SUPPORT FOR CORN HARVESTING UNIT

[76] Inventors: Lester Dale Schreiner, 301 N. Scott St., Ankeny, Iowa 50021; John Joseph Shindelar, 295 N. W. 66th Ave., Des Moines, Iowa 50313

[22] Filed: Oct. 22, 1970

[21] Appl. No.: 83,250

Related U.S. Application Data

[60] Division of Ser. No. 5,644, Jan. 21, 1970, Pat. No. 3,589,110, which is a continuation of Ser. No. 662,928, Aug. 24, 1967, abandoned.

[52] U.S. Cl. .................................. 56/106, 56/11.1
[51] Int. Cl. ............................................. A01d 45/02
[58] Field of Search .................. 56/11.1, 11.4, 11.5, 56/105, 106; 74/230.17 A, 230.17 F

[56] References Cited
UNITED STATES PATENTS

| | | | |
|---|---|---|---|
| 3,101,579 | 8/1963 | Karlsson et al. | 56/105 |
| 3,271,940 | 9/1966 | Ashton et al. | 56/105 |
| 3,180,163 | 4/1965 | Robertson | 74/230.17 A |
| 3,018,666 | 1/1962 | Hoffman | 74/230.17 F |
| 3,162,989 | 12/1964 | Wheeler | 56/11.1 |
| 3,466,854 | 9/1969 | Ashton et al. | 56/11.1 |

*Primary Examiner*—Antonio F. Guida
*Attorney*—William A. Murray et al.

[57] ABSTRACT

A support and drive for a corn harvesting unit that includes a gear housing adapted for transverse adjustment along a transverse beam and having a transverse shaft receiving opening that permits adjustment of the gear housing along a transverse drive shaft, a corn harvesting unit framework supported at its rear end on the gear housing whereby the framework in the corn harvesting mechanism carried on the framework is supported in cantilever fashion on the gear housing, and gear mechanism within the gear housing having external terminal portions connected to the harvesting mechanism whereby the entire harvesting mechanism is driven by gears within the gear housing and the entire harvesting mechanism and its framework is supported on the gear housing.

7 Claims, 10 Drawing Figures

Patented Sept. 18, 1973 3,759,021

Patented Sept. 18, 1973  3,759,021

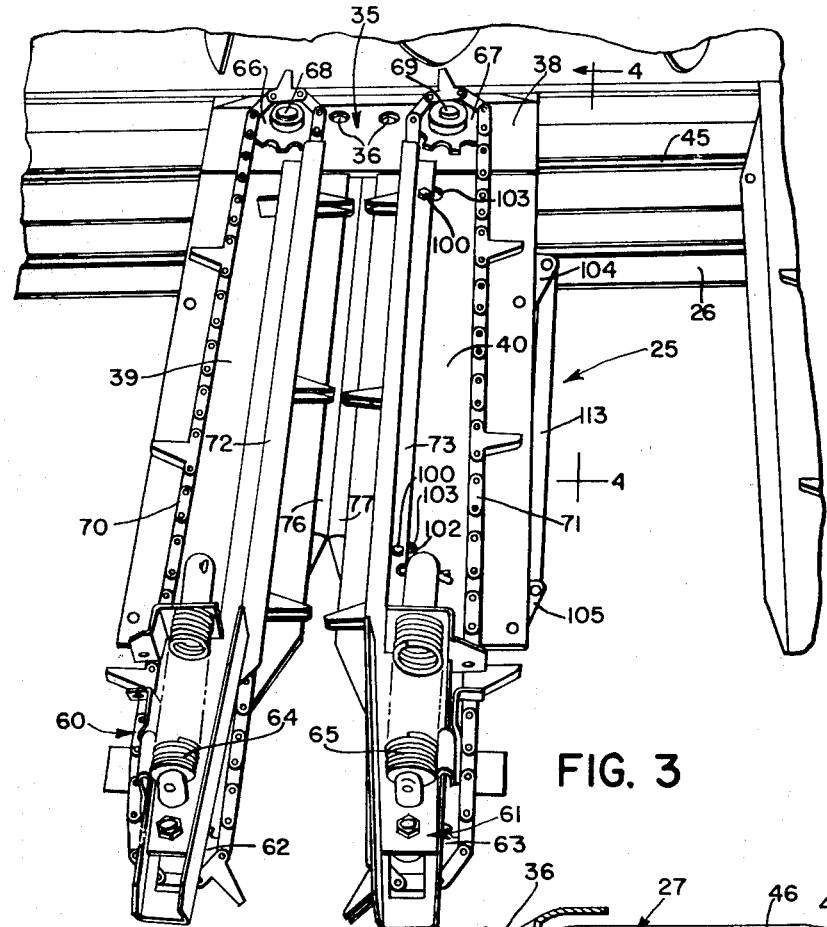
FIG. 3
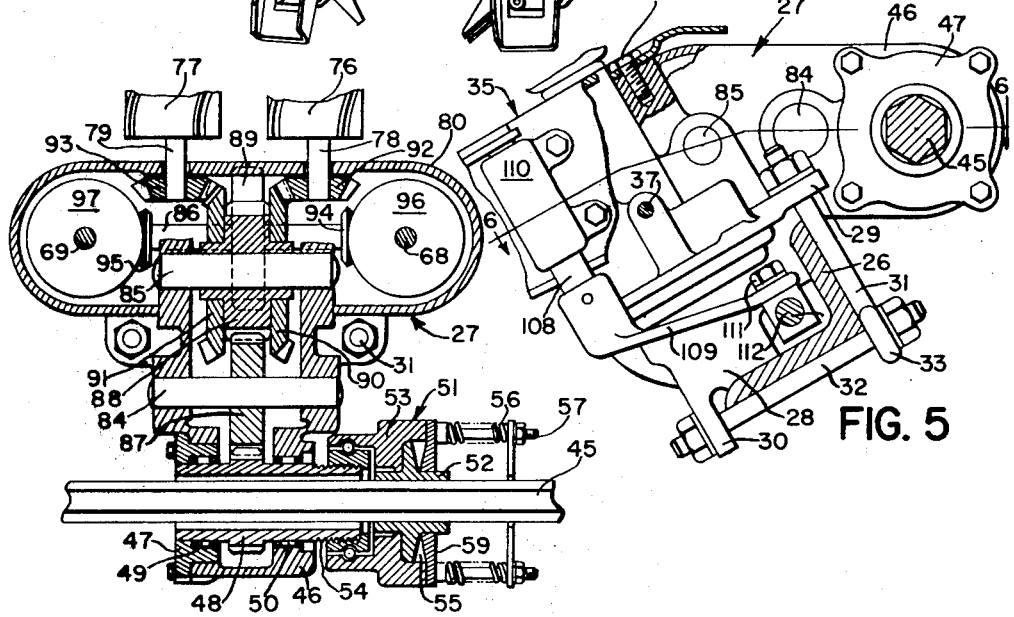
FIG. 6
FIG. 5

GEAR DRIVE AND SUPPORT FOR CORN HARVESTING UNIT

This is a division of previous U.S. Pat. application Ser. No. 5,644 filed Jan. 21, 1970, now U.S. Pat. No. 3,589,110, the previous application being a continuation of yet an earlier application, Ser. No. 662,928 filed Aug. 24, 1967 and now abandoned.

BACKGROUND OF THE INVENTION

The invention pertains to a corn harvester attachment adapted to be mounted on the forward end of a combine. More particularly the invention pertains to the structure for mounting and driving the individual harvesting units of a multi-row harvester attachment on a single transverse beam and a single transverse drive shaft that spans the expanse of several rows of corn.

It has heretofore been known to provide a transverse beam on a corn harvester attachment that extends across several rows of corn and to have the individual row units for the respective rows of corn to be supported for transverse adjustment along the transverse beam. The latter adjustment is necessary to accommodate various spacing between the rows of corn. It has also been known to provide a transverse drive shaft means that is adjustable in various manner to accommodate itself to the drive mechanism on the respective row units at different spacing between the row units. Such a support and drive is shown in U.S. Pat. No. 3,589,110 issued June 29, 1971 to Schreiner et al.

SUMMARY OF THE INVENTION

In the present invention there is provided a single gear housing that is supported on a transverse beam extending across several rows of plants. The gear housing serves as the primary and only support for the framework of the respective row units which in turn serves as the only and main support for the harvesting mechanisms of the row units. The gear housing has gear trains therein serving as the only drive means for the harvesting mechanism on the respective framework. Each gear housing has a transverse opening that circumscribes a single transverse drive shaft extending substantially the full width of the harvester attachment. The gear train includes a main drive gear supported in the gear housing concentric with the main drive shaft that extends through the housing. The gear train operates the entire harvesting mechanism of the respective row unit. The main gear is drivingly connected to the main drive shaft by a clutch having one of its parts slidably mounted relative to the main drive shaft but drivingly connected thereto.

The gear housing is further utilized to support in cantilever fashion the main rigid framework for the harvesting mechanism of the respective row unit. Consequently a single gear housing serves in part as the main support for the harvesting unit as well as a container for the drive mechanism to the harvesting mechanisms of the unit.

It is further proposed in the present invention to provide in the fore-and-aft structure of the row units an adjustable plate that defines one side of a plant passage. The adjustable plate is movable transversely on the supporting elements or framework of each row unit so that the width of the respective passageway may be varied. Supported on the transverse beam closely adjacent thereto is a transversely shiftable control rod, also extending the full width of the harvester, and there are means connecting the rod and each of the shiftable plates on the respective row units. Consequently shifting of the transverse rod shifts the transversely adjustable plates of all of the row units in unison.

It is further proposed as part of the present invention to provide an adjustable drive between the main drive on the combine and the main transverse shaft on the harvester whereby the speed or rate of movement of the harvesting mechanisms may be adjusted irrespective of the speed of the combine and in accordance with the characteristics of the corn moving through the harvester.

BRIEF DESCRIPTION OF THE DRAWINGS

FIG. 3 is a front perspective view of a corn harvester mechanism with the housing or styling removed therefrom.

FIG. 5 is an enlarged view of the upper end of the structure shown in FIG. 3 with portions broken away to show internal mechanism.

FIG. 6 is a view taken substantially along the lines 6—6 of FIG. 5.

DESCRIPTION OF THE PREFERRED EMBODIMENT

Figure 1:
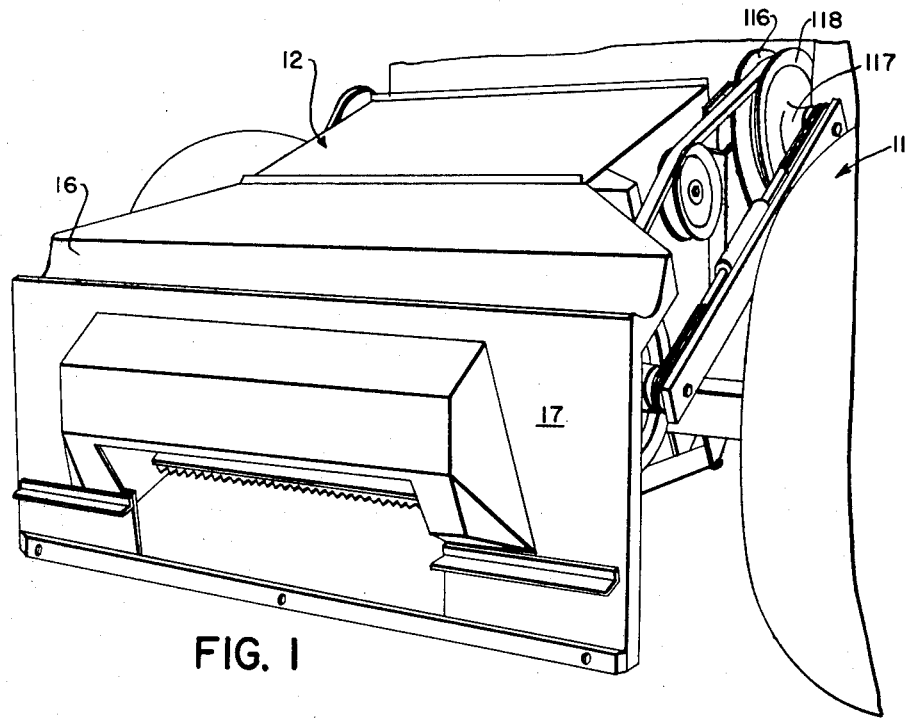
FIG. 1 is a front perspective view of a combine with the corn head portion removed.

The corn head 10 is supported on the forward end of a combine 11, a feeder housing structure 12 being provided between the combine 11 and corn head 10. The corn head 10 has an upper transverse structural tube 13 extending across its upper rear side. A pair of transverse vertical rear walls 14, 15 is supported beneath the beam 13 and terminates adjacent an opening at the center of the corn head 10. The feeder housing 12 is provided with a forward upper horizontal groove 16 that engages the under side of the center portion of the tubular beam 13. A wall 17 is provided beneath the groove 16 and generally fills the gap between the inner edges of the walls 14, 15. The feeder housing 12 is therefore connected to the corn head 10 by inserting the groove 16 beneath the underside of the tubular member 13 and raising until the wall 17 is in vertical alignment with the walls 14, 15. The lower edge of the wall 17 is provided with suitable means for connecting that edge to the corn head housing. This connection is, for purposes of the present invention, of little significance since it is shown and described in U.S. Pat. No. 3,412,534 issued Nov. 26, 1968 to Teale. Should details of this construction be desired, such may be had by reference to this patent.

At opposite ends of the transverse tubular member 13 is a pair of fore-and-aft extending end walls or stylings 18, 19 terminating in a pair of forward gatherers 20, 21. In the present invention, the corn head is utilized to harvest four rows of corn and consequently between the gatherers 20, 21 there are three additional gatherers 22, 23, 24 that feed stalks of corn into the respective passages as the combine moves forwardly. The gatherers 20-24 and the styling or panels extending rearwardly therefrom covers harvesting row mechanism 25 as shown specifically in FIG. 3. All of the row or harvesting units 25 are supported on a single transversely extending main support beam 26 disposed just rearwardly of the respective units 25 and extending substantially the transverse expanse of the corn head attachment 10. Each of the row units 25 is composed of a gear housing 27 having a rigid lower portion 28 with rear and lower surfaces that engage the internal surfaces of the angle iron main beam 26. The portion 28 of the gear housing has upper and lower flanges 29, 30 respectively receiving a pair of bolts 31, 32. The bolt 31 has an eyelet 33 that receives the bolt 32. The bolts 31, 32 extend on the outer sides of the transverse beam 26, as shown clearly in FIG. 5, and when the nuts for the bolts are suitably tightened, the respective gear housings 27 are bolted rigidly to the beam 26. Upon loosening the nuts on the bolts 31, 32 the entire harvesting unit may be shifted transversely on the beam 26 where the nuts may again be tightened.

Plate structure or framework 35 is bolted to the respective gear housings 27 by bolts 36, 37. The plate structure 35 is composed of a rear plate 38, partially overlying the gear housing 27, and a pair of fore-and-aft extending deck plates 39, 40 spaced transversely apart to have inner adjacent edges defining a fore-and-aft extending passage through which stalks may move. Depending from the underside and fixed to the plates 39, 40 are vertical flanges or plates, such as at 41, that serve to rigidify the entire plate structure. As is evident in FIG. 4, the vertical flange 41 receives the bolt 37 by which the plate structure 35 is carried on the respective gear housing 27. As is clearly evident, the entire structures 35 are supported in cantilever fashion on the respective gear housings 27.

Above and slightly rearwardly of the main transverse support beam is a transversely extending drive shaft 45. The shaft 45 also extends substantially the entire width of the row unit 10. Each of the gear housings 27 is provided with a rear portion 46 having a transverse horizontal opening that receives a portion of the shaft 45. A cover plate 47 is provided at one end of the gear housing portion 46 and when removed, provides access into the gear housing 27. A gear 48 is supported concentrically with the shaft 45 within the housing portion 46 and has hub portions journaled at 49, 50 to the gear housing portion 46 and the cover plate 47. The main gear 48 is not, therefore, normally mounted in driving relation with the shaft 45. For this purpose, there is provided a clutch mechanism 51. The clutch 51 is composed of a first part 52 fixed to rotate with the shaft 45 and a second part 53 fixed to rotate with the gear 48, a threaded joint 54 being provided for connection of the parts 53 and 48. The part 53 has a radial plate 59 supported thereon with teeth 55 that intermesh with teeth on the part 52. The plate 59 is biased by springs 56, carried on bolts 57, so that the teeth remain intermeshed. As the shaft 45 rotates, the gear 48 is driven by the clutch 51. However, should there be an excessive load, due either to malfunction or excess material in the harvesting mechanism 25, the clutch will slip at the teeth 55.

Carried on the forward ends of the deck plates 39, 40 are sprocket devices 60, 61 that include a pair of sprockets 62, 63 respectively provided with spring tension means 64, 65 respectively tending to bias the sprockets forwardly. The exact mounting means for the sprockets 62, 63 are not important for a full appreciation of the present invention. A rear pair of sprockets 66, 67 is provided above the deck rear plate 38 and is carried on sprocket shafts 68, 69. A pair of chains 70, 71 is carried by the sprockets 62, 68 and 63, 67 respectively and has inner runs adjacent to one another so as to engage and drive stalks moving through the passage in a rearward direction. A pair of chain guides 72, 73 is provided outside of the respective inner runs and tends to prevent the runs from moving outwardly in respect to the passage. A pair of rotatably driven harvesting rolls 76, 77 is provided beneath the deck plates. The rolls are carried on roll shafts 78, 79 respectively, the latter extending through a forward vertical wall 80 of the gear housing 27.

Supported within the housing 27 are three transverse horizontal gear shafts 84, 85, 86 having intermeshing spur gears 87, 88 and 89 respectively mounted thereon. The gear 87 meshes with the teeth of the gear 48 and consequently the gears on the respective shafts are forced to rotate. The shaft 85 carries a pair of spur gears 90, 91 driving spur gears 92, 93 on the harvesting roll shafts 78, 79. The shaft 86 carries a pair of spur gears 94, 95 meshing with large spur gears 96, 97 fixed to the sprocket shafts 68, 69. As may be seen, therefore, the entire harvesting mechanism on the respective row units 25 are driven entirely by gears within the housing 27 and from a basic connection to the main drive shaft 45.

Figure 4:
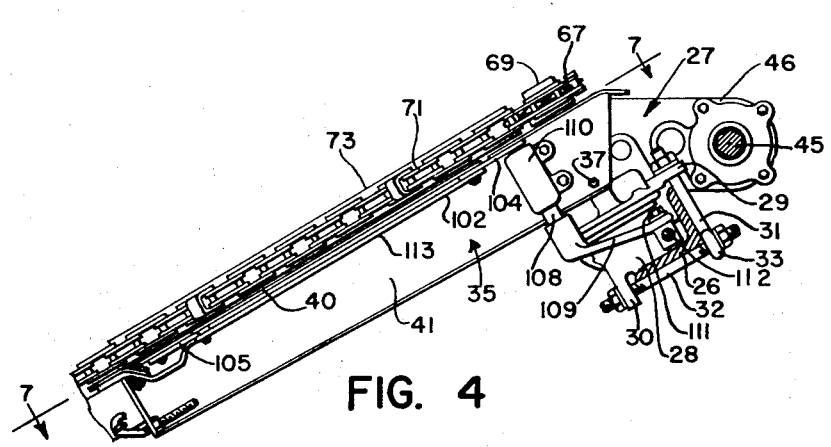
FIG. 4 is a sectional view taken substantially along the lines 4—4 of FIG. 3.
Figure 7:
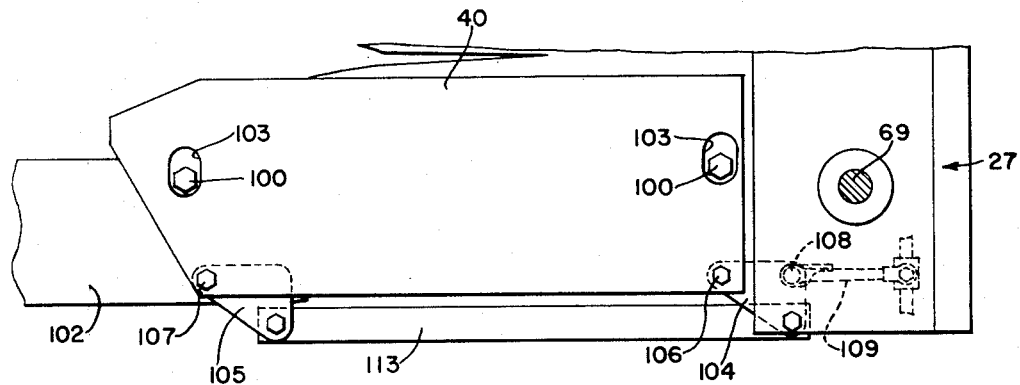
FIG. 7 is a view taken substantially along the lines 7—7 of FIG. 4.

Referring now to FIGS. 3, 4 and 7, the deck plate 40 is adjustable in a transverse direction. The chain guide 73 has a laterally disposed flange that rests on top of the plate 40 and is bolted as at 100 to a laterally disposed flange 102 that is rigid with the vertical plate 41. Sandwiched between the flange of the chain guide 73 and the flange 102 is the deck plate 40. The plate 40 has a pair of transverse slots 103 that receives the bolts 100. Thus, the plate 40 is adapted to shift transversely. On the outer edges of the plate 40 there is pivotally mounted a pair of bell cranks 104, 105. The bell cranks 104, 105 are pinned to the plate 40 by pins 106, 107. The rear bell crank 104 is pinned at 108, the latter pin 108 being journaled in a fitting 110 and having connected thereto a rearwardly projecting arm 109. The rear end of the arm 109 is releasably connected by bolts 111 to a transverse rod 112 disposed directly forwardly of the transverse main beam 26 and between the flanges of that beam. It will be noted there is a hollow area between the lower portion 28 of the gear housing and the beam 26 through which the transverse rod 112 may project. Consequently a single transverse rod 112 extends completely across the rear end of all of the harvesting units and the single rod 112 may control the deck plates 40 and consequently the widths of the respective passages of the harvesting units 25. A link 113 interconnects the bell cranks 104, 105 and, as may be seen from viewing FIG. 7, the link 113 and deck plate 40 are in fact parallel links and the bell cranks 104, 105 are further parallel links so that as the bell crank 104 is rotated the deck plate is guided uniformly inwardly or outwardly. The slots 103 permit transverse adjustment of the plates 40. The bolts 111 may be loosened to permit shifting of the arms 109 along the rod 112 to accommodate transverse adjustment or repositioning of the mechanisms 25 on the beam 26.

Figure 9:
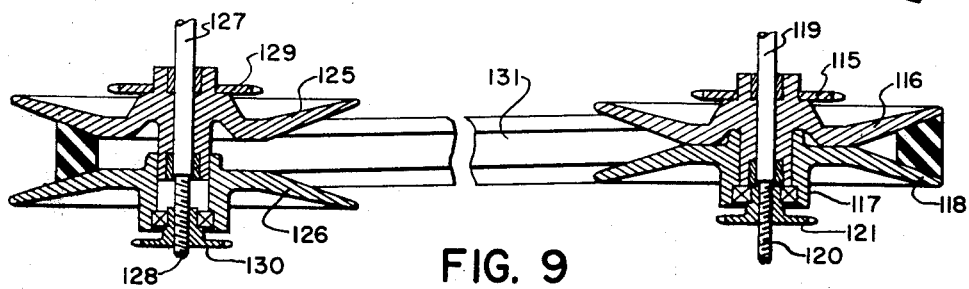
FIG. 9 is a sectional view taken substantially along the lines 9—9 of FIG. 8.
Figure 8:
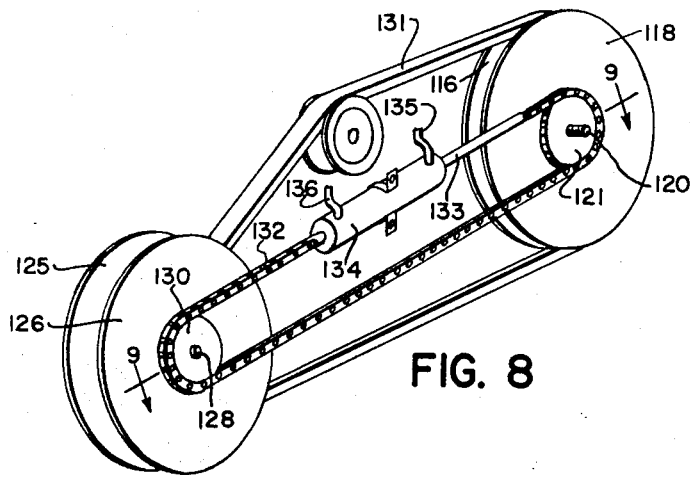
FIG. 8 is a perspective view of a variable speed drive supported on the side of the feeder housing of the combine.
Figure 2:
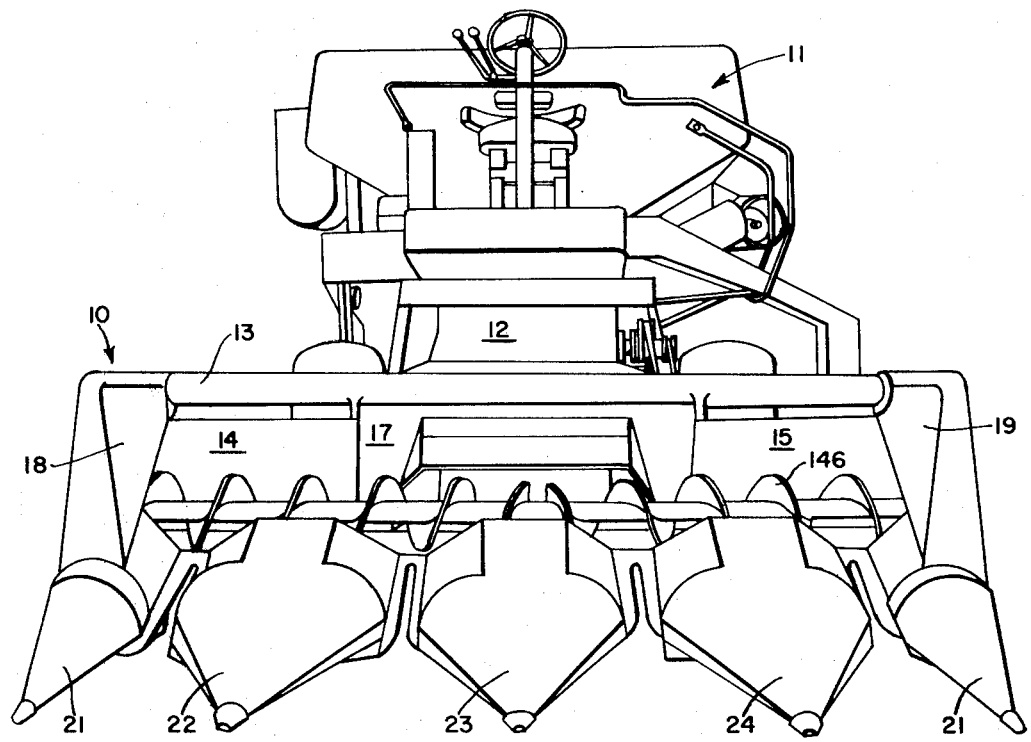
FIG. 2 is a front and perspective view of the combine with a corn head attached thereto.

Power for operating the entire corn head is received from the power source of the combine by means of a power input sprocket 115 fixed to one part of an expandable belt pulley 116. The sprocket part 116 has a central hub portion 117 on which is slidably carried a second part 118 of the expandable pulley. The hub 117 is carried on a mounting shaft 119 having an outer threaded end 120. As may be seen from FIG. 1, the sprocket parts 116, 117 are supported on the upper end of the feeder housing 12 and the input sprocket 115 is closely adjacent to the combine where it may easily be driven by power from the combine. Carried on the threaded end 120 is a sprocket 121 having a hub portion bearing against the hub portion of the pulley part 118. Consequently as the sprocket 121 is threaded along the threaded part 120 it moves the sprocket part 118 axially to increase or decrease the effective width of the groove between the parts 116, 118. At the lower end of the feeder housing, there is provided a similar structure that includes a pair of relatively movable pulley parts 125, 126 supported basically on a support shaft 127 having an outer threaded end 128. An output sprocket 129 is fixed to rotate with the sprocket part 125. An adjusting sprocket 130 is threadedly mounted to the threaded end 128 and its hub portion bears against the hub portion of the pulley part 126. Consequently as the sprocket 130 is threaded along the threaded part 128, it adjusts the effective width of the pulley groove. It will be noted from viewing FIG. 9 that the threads on the shaft parts 120, 128 are of opposite hand so that as both sprocket parts 121, 130 move in clockwise or counterclockwise directions there is an opposite effect on the width of the respective grooves in the pulley structures. A belt 131 is played over the respective pulley parts 116, 118 and 125, 126 and a chain 132 is played over the sprockets 121, 130. Opposite ends of the chain 132 are connected to opposite ends of a rod 133 that extends outwardly of opposite ends of a hydraulic cylinder 134. Fixed to the rod 133 internally of the cylinder 134 is a piston, not shown, that may be actuated for axial movement within the cylinder 134 by hydraulic lines 135, 136. As is clearly apparent, by suitable shifting of the piston within the cylinder 134, the chain 132 is caused to shift and to rotate the respective sprockets 121, 130 in a single direction, the latter action creating shifting of the shiftable pulley parts 118, 126 and to thereby adjust the speed of the output sprocket 129.

Figure 10:
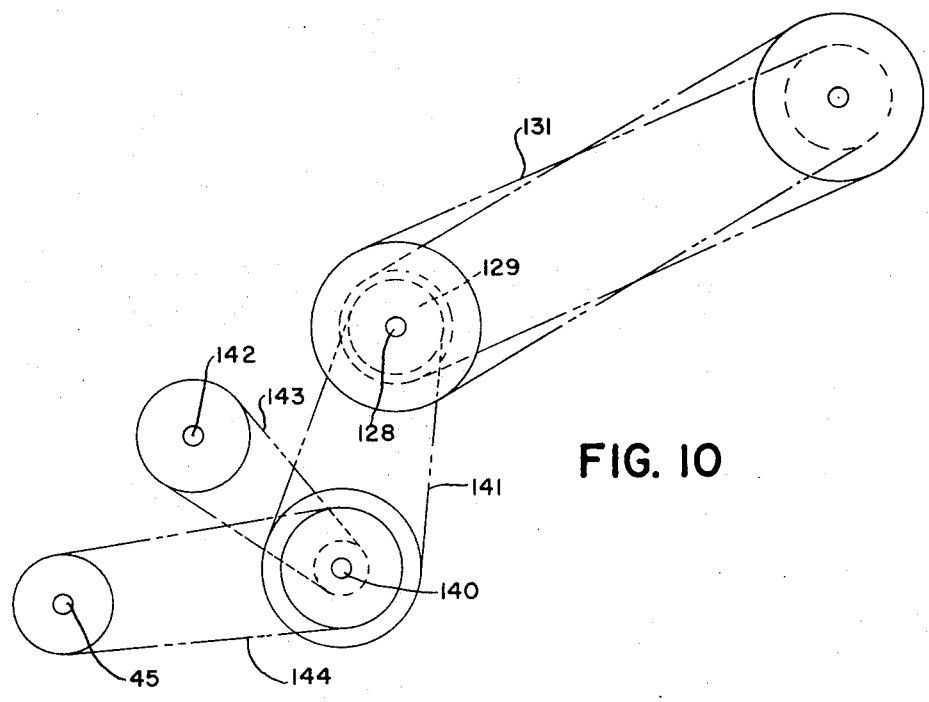
FIG. 10 is a schematic view of the drive for the corn head.

The input sprocket 115 of the above drive, as previously mentioned, receives its power from the main power source of the combine. It is believed such is significant for the reason that the rate of movement of the drive chains 70, 71, the harvesting rolls 76, 77, and the auger device 146 that extends transversely across the rear ends of the harvesting units 25 may be adjusted without regard to the rate of movement of the combine over the field. Referring now to FIG. 10, the output sprocket 129 drives a countershaft 140 through a flexible drive 141. The shaft 140 drives an auger drive shaft 142 by a flexible drive 143 and also drives the main harvesting unit shaft 45 through a flexible drive 144. Thus, it may seem that the adjustable drive consisting of the adjustable pulleys and the V-belt 131 affects the rate of rotation of the auger 146 and the various movable parts on the individual harvesting units 25 that are controlled by the unit drive shaft 45.

We claim:

1. In the combination of a corn harvester and a combine with a power source and having a forwardly directed feeder housing with a forward end detachably connected to the corn harvester, and the corn harvester having a plurality of harvesting units disposed in side-by-side relation across a plurality of transversely spaced rows of corn, and in which each harvesting unit has a pair of rotatably driven harvesting rolls and driven gathering chains, the improvement comprising: a transverse drive shaft supported on the harvester; drive means connecting the harvesting rolls and gathering chains of each of the harvesting units to the drive shaft; an adjustable drive means supported on the feeder housing driven by the main power source and drivingly connected to the drive shaft, the latter means being adjustable whereby the rate of movement of the rolls and chains for all of the units are adjustable in unison and irrespective of the rate of movement of the vehicle over the ground.

2. The invention as set forth in claim 1 further characterized by slip clutch means being provided in the aforesaid drive means so as to permit stoppage of the harvesting units upon an overload being created within the drive means and by the harvesting units.

3. The invention as set forth in claim 1 in which the feeder housing has opposite fore-and-aft extending upright sides and the adjustable drive means includes a belt driven variable speed pulley drive mounted on one of the sides of the feeder house.

4. In combination, a crop-treating unit, a forwardly directed feeder structure extending downwardly from an upper rear end feeding into the crop-treating unit to a lower forward end and including a feeder housing; a harvester forwardly of the feeder housing having a plurality of harvesting units disposed in side-by-side relation across a plurality of transversely spaced rows of corn with each unit having operable parts for harvesting a row of corn; a transverse horizontal drive shaft supported by the harvester and connected to the operable parts for driving the latter; a variable speed belt drive mounted on the feeder housing including a drive and a driven pulley, at least one of which is variable in effective width for adjusting the speed of the driven pulley; and a drive connection between the driven pulley and transverse shaft for varying the speed of the operable parts in unison.

5. The invention as set forth in claim 4 in which the adjustable pulley may be expanded or narrowed by remote control means.

6. The invention as set forth in claim 4 in which the adjustable pulley may be expanded or narrowed by extending or retracting a hydraulic cylinder associated therewith and the remote means includes hydraulic hoses connected to the cylinder.

7. In combination, a crop-treating unit, a forwardly directed feeder structure extending downwardly from an upper rear end feeding into the crop-treating unit to a lower forward end and including a feeder housing; a harvester forwardly of the feeder housing having a plurality of harvesting units disposed in side-by-side relation across a plurality of transversely spaced rows of corn with each unit having operable parts for harvesting a row of corn; a transverse horizontal drive shaft supported by the harvester means connecting the shift to the operable parts of each harvesting unit for driving the latter with each means including a slip clutch for permitting the operable parts of the respective unit to cease operation; a variable speed belt drive mounted on the feeder housing including a drive and a driven pulley, at least one of which is variable in effective width for adjusting the speed of the driven pulley; and a drive connection between the driven pulley and transverse shaft for varying the speed of the operable parts in unison.

* * * * *

UNITED STATES PATENT OFFICE
CERTIFICATE OF CORRECTION

Patent No. 3,759,021                     Dated  18 September 1973

Inventor(s)  Lester Dale Schreiner and John Joseph Shindelar

It is certified that error appears in the above-identified patent and that said Letters Patent are hereby corrected as shown below:

Column 6, line 42, change "corn" to -- crop --; line 43, change "corn" to -- crop --; line 67, change "corn" to -- crop --.

Column 7, line 1, change "corn" to -- crop --; line 2, change "shift" to -- shaft --.

Signed and sealed this 2nd day of April 1974.

(SEAL)
Attest:

EDWARD M. FLETCHER, JR.                C. MARSHALL DANN
Attesting Officer                       Commissioner of Patents